United States Patent [19]
Harter, Jr.

[11] Patent Number: 6,098,179
[45] Date of Patent: Aug. 1, 2000

[54] METHOD AND APPARATUS FOR PERFORMING ERROR DETECTION

[75] Inventor: Paul Karl Harter, Jr., Groton, Mass.

[73] Assignee: Digital Equipment Corporation, Maynard, Mass.

[21] Appl. No.: 09/010,899

[22] Filed: Jan. 22, 1998

[51] Int. Cl.[7] .................................................. G06F 11/00
[52] U.S. Cl. ................................. 714/4; 714/18; 714/43; 714/704; 714/749
[58] Field of Search ................................. 714/4, 48, 54, 714/705, 47, 704, 18, 20, 43, 748, 749, 821

[56] References Cited

U.S. PATENT DOCUMENTS

| | | | |
|---|---|---|---|
| 4,914,657 | 4/1990 | Walter et al. | 714/4 |
| 5,109,384 | 4/1992 | Tseung | 714/4 |
| 5,187,811 | 2/1993 | Baker et al. | 714/4 |
| 5,220,567 | 6/1993 | Dooley et al. | 714/45 |
| 5,481,548 | 1/1996 | Wallace | 714/704 |
| 5,530,705 | 6/1996 | Malone, Sr. | 714/704 |
| 5,588,132 | 12/1996 | Cardoza . | |
| 5,684,944 | 11/1997 | Lubbers et al. | 714/6 |
| 5,784,547 | 7/1998 | Dittmar et al. | 714/4 |
| 5,909,540 | 6/1999 | Carter et al. | 714/4 |
| 5,924,122 | 7/1999 | Cardoza et al. | 711/150 |

OTHER PUBLICATIONS

Gilette, R., "Memory Channel Network for PCI", IEEE Micro, Feb. 1996, pp. 12–18.

Cardoza, W. et al, "Design of the TruCluster Multicomputer System for the Digital UNIX Environment", Digital Technical Journal, vol. 8, No. 1, 1996 pp. 5–17.

*Primary Examiner*—Robert W. Beausoliel, Jr.
*Assistant Examiner*—Scott T. Baderman
*Attorney, Agent, or Firm*—Williams, Morgan & Amerson, P.C.

[57] ABSTRACT

A method and apparatus for performing error detection in a network is disclosed. An error counter is stored in a common memory location accessible by all nodes. The error counter includes separate partitions associated with each node in the network. Each partition includes two error counter values representing, respectively, sending and transmission error counts, for a corresponding node. No global locking mechanism is required to synchronize access to the commonly accessed error counter. Rather, access to the error counter is provided by having code executing on each node adhering to rules regarding the types of access to the various partitions in the error counter. Each node may read from any partition, but may only write to its own partition.

48 Claims, 6 Drawing Sheets

METHOD AND APPARATUS FOR PERFORMING ERROR DETECTION

BACKGROUND OF THE INVENTION

This invention relates generally to the field of computing, and more particularly, to error detection in a computer system.

As it is known in the art, a computer system may include a central processing unit (CPU), and system resources, such as memory and I/O devices. In a network, two or more computer systems or nodes are connected and communicate through a network communication medium for internode communication. A first process executing in one node may send a data transmission to another process executing in another node of the network. Problems may be encountered in either transmitting or receiving the data transmission in a network. A hardware and/or software mechanism is generally used to detect and handle data transmission errors.

In internode communication, a sending or transmitting node typically requires confirmation that the data transmission to a receiving node has completed reliably, that is that the receiving node has successfully received the data uncorrupted, and the sending node does not need to retransmit the data. The receiving node generally examines the data when all data has been transmitted uncorrupted and complete.

Using one technique, the sending node sends a data transmission to a receiving process in accordance with the pseudo-code description below:

---

Sending node:

```
write first portion of data
request acknowledgment from receiving node(s) that
    the first portion of data is received successfully
:
write last portion of data
request acknowledgment from receiving node(s) that
    the last portion of data is received successfully
:
write DONE flag      /* indicating transmission is complete */
request acknowledgment from receiving node(s) that
    the flag is received successfully
```
Receiving node:
```
send acknowledgments for each portion of data received
wait for DONE flag      /* indicating data is ready for processing */
```
-continued
```
send acknowledgment for DONE flag data
process data
```
---

In the foregoing description, any individual write operation of a portion of data may have been unsuccessful. Accordingly, the sending node verifies that the receiver has received the data by requesting an acknowledgment signal from the receiving node as each data portion is successfully received. The DONE flag is set when the sending node completes transmission of the data and no errors are encountered by the sending node.

One drawback of this first technique is the length of time for an entire data transmission to complete due to the transmit time or latency for the acknowledgments sent from the receiving node for each data portion. Additionally, a large portion of network bandwidth is devoted to transmitting acknowledgments thereby decreasing the data carrying capacity of the network.

As a result of the first technique's drawback, a second technique does not require the acknowledgment requests from the receiving node for each data portion transmitted. However, this second technique as will be described is generally used in networks having an alternative internode communication mechanism to message passing to communicate error counter values among nodes in the network.

In this second technique, a global error counter is used in error detection. Generally, the sending node and receiving node examine a global error counter value "before" and "after" a data transmission. An error handler routine on each node increments a global error counter when an error occurs on that node. Thus, if the global error counter is the same value both "before" and "after", the sending node and receiving node conclude that there has been no sender or receiver data error. The following pseudocode description summarizes this second technique:

--- sending node:

```
L1:     read global Error Counter (GEC) /* this is the "before" GEC */
        <write all data portions>
        write "before" GEC to receiving process
        write DONE flag    /* to indicate that data transmission is complete */
        compare "before" GEC to current GEC /* current GEC is "after" GEC */
        if "before" GEC = current GEC
        then
            done with transmission     no errors */
        else
            retransmit by going to L1   /* errors */
receiving node:

L1:     wait for DONE flag
        read "before"GEC /* guaranteed ordering ensures that when DONE flag
            is read by the receiving node, GEC has been sent */
```

-continued

```
if "before" GEC = current GEC
then
    successful transmission and process data
else
    start over and go to L1
error handler:
    when an error occurs
    mutex begin /* mutually exclusive access to error counter during update */
        update GEC to reflect current error
    mutex end /* end mutually exclusive access to error counter */
```

In the foregoing description, there is an assumption that the ordering of write operations by the sending node are observed and received by the receiving node in the order in which they are dispatched by the sending node.

There are several drawbacks with the foregoing second technique. One drawback is relevant when there is more than one sending or receiving node. In this instance, the global error counter only captures summary information that an error has occurred in data transmission. Thus, it is not possible to determine which data transmission from which sending node to which receiving node has failed.

Another drawback is that the second technique requires a locking mechanism to ensure that the error handler has mutually exclusive access to the global error counter. Generally, mutually exclusive access to a shared resource, such as the global error counter, is synchronized by using a locking and an unlocking operation. Use of this locking mechanism also has several drawbacks. One drawback is that the lock and unlock operations tend to be expensive in terms of computer resources. Another drawback is that implementations of the lock and unlock operations are generally written to operate in an environment in which an error state is not being processed. In other words, lock and unlock implementations typically are dependent upon various system hardware and software states. This is in direct opposition to what is required to synchronize access to the global error counter since the error counter is updated when an error is being processed. Since the global error counter is updated when an error has occurred, some of the underlying assumptions and dependencies of commonly used lock and unlock implementations do not permit these locking implementations to be used when synchronizing access to the global error counter.

Thus, there is required an efficient technique for performing error detection in a network which provides for accurate error detection and reporting and localized error information to minimize error recovery actions without requiring use of locking and unlocking operations.

SUMMARY OF THE INVENTION

In accordance with principles of the present invention, a method and a computer program product for performing error detection in a shared memory network is disclosed in which nodes of the network use error counters stored in shared memory address space. Error detection is performed during communication between a first and second node in the network. Each node in the network maintains a set of error counts. Each set includes a plurality of individual error counts in which each individual error count is exclusive to a particular node indicating errors for only that particular node. For a communication between a first and second node, the first node examines the first and second error counts associated, respectively, with the first and second nodes. An error recovery procedure is initiated if either the first or second error counts was incremented.

Thus, there is provided an efficient technique for performing error detection in a network which provides for accurate error detection and reporting and localized error information to minimize error recovery actions without using a locking mechanism.

BRIEF DESCRIPTION OF THE DRAWINGS

The above-mentioned other features of the invention will now become apparent by reference to the following description taken in connection with the accompanying drawings, in which.

DESCRIPTION OF THE PREFERRED EMBODIMENT

Figure 1:
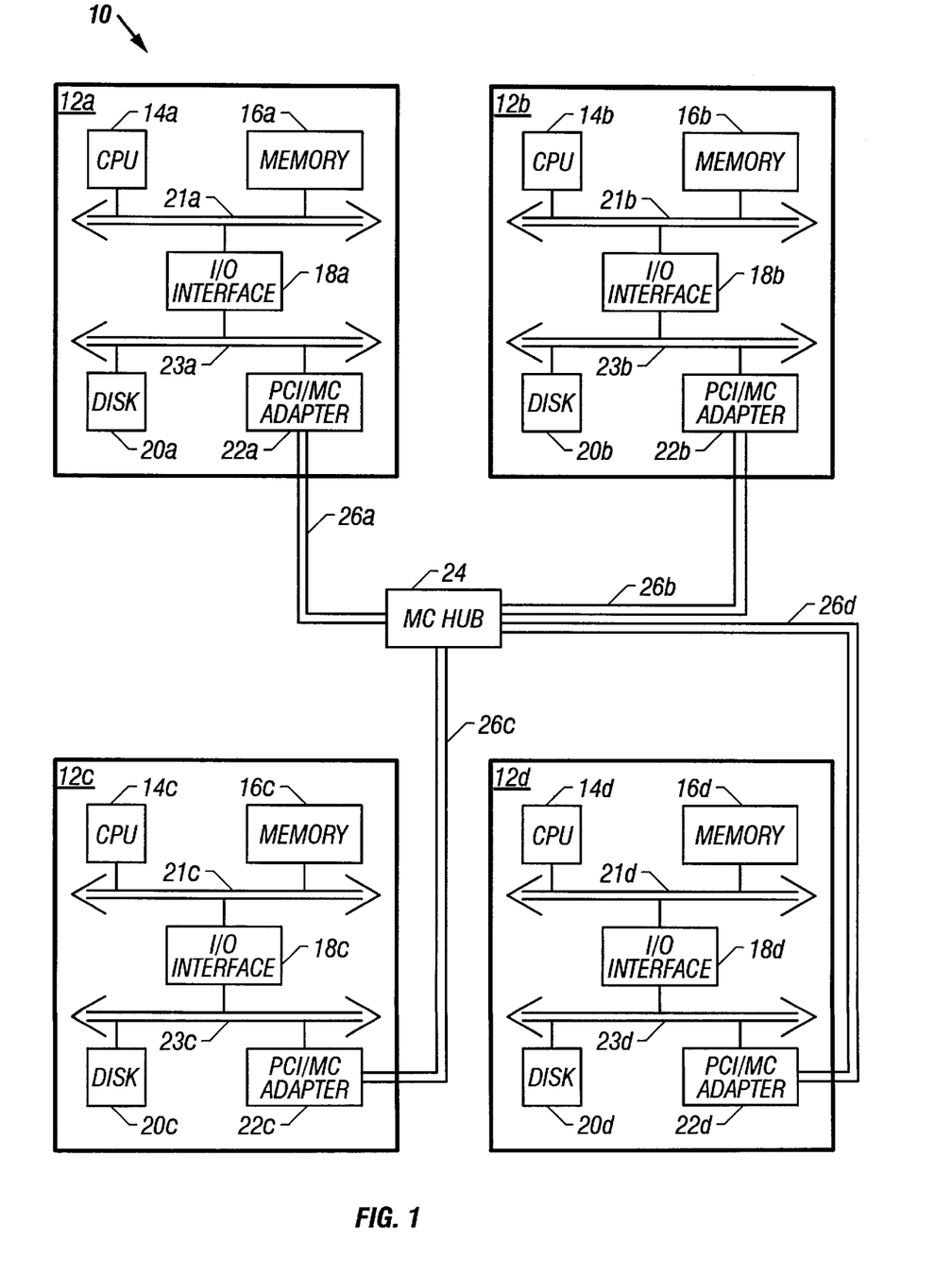
FIG. 1 is a block diagram of an embodiment of a computer system.

Referring now to FIG. 1, an embodiment of a computer system 10 is shown. In this particular embodiment, the computer system 10 is a Memory Channel™ (MC) network 10 of processing systems which include a plurality of nodes 12a–12d, each coupled via a high speed network connection 26a–26d, respectively to an MC hub 24. The high speed network connections link the PCI/MC adapters of each of the nodes to the MC hub 24. The MC hub 24 is a multiport Memory Channel™ hub linking nodes 12a–12d of the network. Although each of the nodes 12a–12d are shown here as having identical components, it is to be understood that each node may be configured differently within the constraints of the invention as described herein. For example, each node may include more than one processor, system bus, or different input/output (I/O) devices controlled by one or more different operating systems.

Node 12a includes a CPU 14a and a memory 16a coupled to a local bus 21a. An I/O interface 18a is also coupled to the local bus 21a. The I/O interface 18a is used to couple external devices that are coupled to a bus 23a to the node memory 16a and CPU 14a. The bus 23a is a high performance bus operating according to the Peripheral Chip Interface (PCI) bus protocol and is hereafter referred to as the PCI bus 23a.

A plurality of external devices may be coupled to the PCI bus 23a such as a disk device 20a, a printer interface (not shown), or a network interface (not shown). Also coupled to the PCI bus 23a is PCI to Memory Channel™ adapter 22a. The PCI/MC adapter 22a is used to connect the node 12a to the other nodes 12b–12d in the network 10. Each of nodes 12b–12d contains components similar to those as described for node 12a.

Each of the PCI/MC adapters 22a–22d is coupled to MC hub 24 which provides for interconnectivity among the nodes. Generally, the MC hub 24 may be viewed as a backplane or connector. Such an arrangement allows each of the nodes to communicate with other nodes in the MC network 10, as will be described below. It should be noted that each of the PCI/MC adapters 22a–22d may alternatively be coupled directly to each bus 21a–21d, respectively, in each node with a small change in the below described operational functionality. It should also be noted that a network including only two nodes may alternately be configured by directly coupling two PCI/MC adapters, such as 22a and 22b, without an intervening MC hub 24. However, for purposes of clarity, only the embodiment of the invention illustrated in FIG. 1 will be described.

Figure 2:
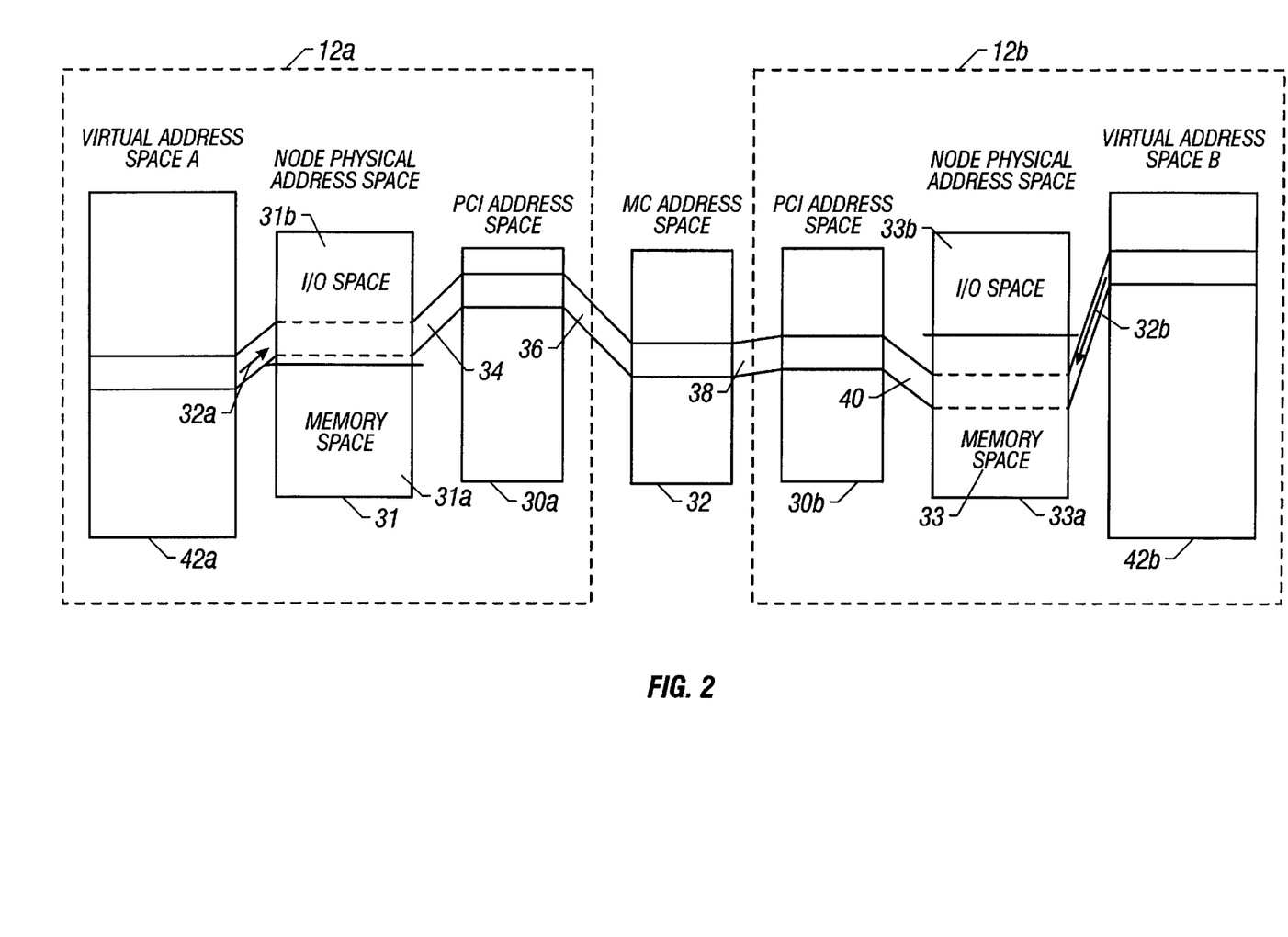
FIG. 2 is block diagram of an embodiment of memory mapping by two processes sharing a portion of memory accessed using a Memory Channel™ (MC)

Referring now to FIG. 2, shown is a block diagram of an embodiment of address mapping between two nodes of the network 10 accessing a common portion of MC address space. FIG. 2 generally illustrates a technique of mapping a common portion of MC address space which is accessed by the two nodes and contains data structures used to communicate data or coordinate activities between the two nodes in the network 10. It should be noted that although FIG. 2 illustrates only two nodes accessing the common portion of MC address space, the technique may be generalized so that the common portion is accessed by more than two nodes. Generally, this figure illustrates the mappings performed when data, for example, is written from node A to node B.

Virtual address space A 42a represents the virtual address space range of a process A executing in one of the nodes of the network 10, such as node 12a. Virtual address space B 42b similarly represents the virtual address space of a process B executing on another node of the network 10 such as node 12b.

In paragraphs that follow, a description of how virtual addresses in node 12a and node 12b are translated into an address in node physical address space 33 is set forth.

Virtual address space A 42a is mapped 32a onto node physical address space 31. The node physical address space 31 is divided into two portions, memory space 31a and I/O space 31b. In this embodiment, node memory space 31a represents the physical address space range to which memory 16a of node 12a corresponds. In other embodiments, a node's physical address space, such as 31, may be divided into more than two portions.

A portion of virtual address space A 42a is mapped 32a onto the node physical address space 31 using standard page table mappings providing address translation between from virtual and physical addresses. A virtual address from virtual address space A 42a may be translated to a node physical address in the node physical address space 31 located in either memory space 31a or I/O space 31b. In this embodiment, memory space 31a represents that portion of the physical address space which is local to a node, such as node 12a. In other words, memory space 31a generally represents local physical memory. Reads and writes to memory space 31a by CPU 14a access local memory 16a on node 12a. I/O space 31b generally represents that portion of node physical address space 31 that is used to interact with I/O devices, such as adapters and controllers. Reads and writes to I/O space 31b are directed to an I/O interface 18a and forwarded to the corresponding I/O device. In the embodiment of FIG. 2, mapping 32a maps a portion of virtual address space A 32a onto a portion of I/O space 31b.

Subsequently, an address such as one in the I/O space 31b is mapped 34 to another address in the PCI address space 30a by the I/O interface 18a. The PCI address is mapped to another address in MC address space 32 by the PCI/MC adapter 22a.

Generally PCT tables are used to control how data is sent and received with respect to a particular MC address space range. In the PCT (not shown), there is one entry for each page of MC address space. Each entry of the PCT contains control bits which control the sending, or transmitting, and receiving of data using the MC. The particular PCT control bits relevant to this embodiment are described in more detail in conjunction with figures and paragraphs that follow.

An address in the MC address space 32 is mapped 38 to the PCI address space 30b of another node, such as node 12b by the PCI/MC adapter 22b. Subsequently, an address in PCI address space 30b is mapped 40 to an address in memory space 33a in node physical address space 33 residing on node 12b. Node physical address space 33 is similarly apportioned as node physical address space 31.

This physical address space is accessed by processes on node 12b via virtual to physical mappings 32b that are similar to 32a.

In the foregoing description, it should be noted that the various pages of virtual address space mapped onto node physical address space need not be mapped to consecutive and contiguous node physical address space ranges. Similarly, various pages which are mapped between the different address spaces need not be in adjacent or contiguous address ranges.

As an example illustrating the communication between nodes 12a and 12b, suppose a write is made to a portion of virtual address space A 42a which is translated via the mapping process as shown in FIG. 2 to an MC address in the MC address space 32. The MC address space 32 is ultimately translated into an address in memory space 33a of node 12b. Accordingly, a first node communicates with a second node in the network 10 by writing to its own MC address space. Similarly, writes to the shared portion of MC address space 32 by node 12b are translated by mapping to an address in the MC address space 32 using process page tables similar to those described in the mapping 32a. This MC address is further translated to an address in the memory space 31a of node 12a making a write operation by node 12b visible to node 12a. Such an arrangement allows for communication between the CPU or external I/O devices of various nodes by providing memory mapped connections which are established between the nodes.

In summary, using the MC, a common network address space is provided to facilitate communication between various nodes, such as 12a–12d in the network 10, that allows for sharing of data and communication between processes on different nodes without the complexity of the local area network protocol. Additionally, the detection of errors in any internode communication may be facilitated using an error counter vector stored in the common network address space. A particular embodiment using the error counter vector mapped to a portion of MC address space 32 which is accessible by nodes 12a–12d to detect errors in data transmission between nodes in the network 10 is described in later paragraphs.

When an error occurs during the transmission of data from one node to another, the error is detected by the PCI/MC adapter of either the source node or the destination node (or both). Such errors (generally hardware errors) are typically detected through a parity check, an error checking technique which is well known in the art. Each PCI/MC adapter (22a–22d) of each node has a four-bit register called the Link Control Status Register (LCSR, not shown in FIG. 1). The bits in this register are flags which may be set to indicate different conditions relative to the data transmission to and from the node. Among these flags are the "transmit path error" (TPE) summary bit and the "receive path error" (RPE) summary bit. The TPE summary bit is set if an error occurs on the transmit path. Similarly, the RPE summary bit is set when an error occurs on the receive path. When the PCI/MC adapter detects a hardware error, the appropriate one of these two bits is set to indicate the detection of either a transmit error or a receive error. The setting of one of these bits causes the PCI/MC adapter of a node to interrupt the CPU resulting in the invocation of an interrupt handler routine. The interrupt handler routine reads the register to determine the reason for the interrupt. This interrupt handler routine is discussed in further detail hereinafter.

To track errors within the MC network 10, the nodes of the preferred embodiment use a set of error counters. The error counters in this embodiment are located in a portion of the MC shared memory space 32. A copy of the error counter is stored in the memory of each of the nodes. The copies of the error counters are updated using the MC network. Rather than use a single summary error counter that is updated when an error occurs in any node in the network 10, the present embodiment uses a partitioned counter, or error counter vector, with separate counter fields associated with each particular node. In the preferred embodiment, there are two counters per node, a transmit error counter and a receive error counter. These counters are represented graphically in FIG. 4.

Figure 3:
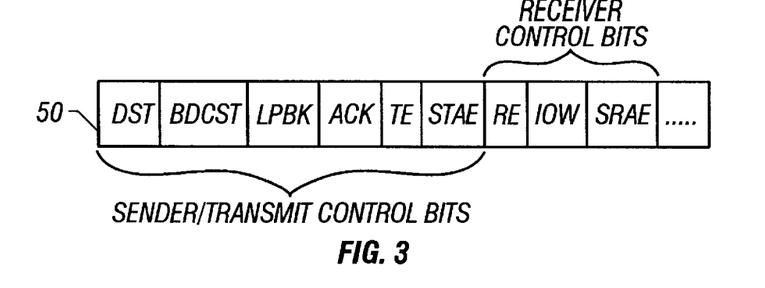
FIG. 3 is a block diagram of an embodiment of page control table (PCT) control bits associated with each page entry in the PCT used in filtering data transmitted using the address mapping of FIG. 2.

Referring now to FIG. 3, shown is a block diagram of an embodiment of the PCT control bits. The PCT control bits specify data transmission and receipt characteristics for data transferred across connections (26a–26d) between the various nodes (12a–12d) of the network 10. In this particular embodiment, six of the control bits are relevant in sending or transmitting, and three of the control bits per PCT entry are relevant for a node receiving data.

The transmit control bits include a DST field, a BDCST field, an LPBK field, an ACK field, a TE field, and an STAE field. The DST field of the PCT control bits 50 indicates which single node in the network is to receive data that is written to a corresponding page of the MC address space. The BDCST field is set to indicate a network broadcast in which every write to a corresponding page of MC address space is sent to all nodes in the network 10. It should be noted that when the BDCST field is used, any value in the DST field is ignored. The LPBK field is a loopback field set when every write to a corresponding page of MC address space is to result in a return write to the node that initially issued the write command. The ACK field is set when a write operation to a corresponding page of MC address space requires the PCI/MCI adapter of a receiving node to return an acknowledgment that it has received the data from a sending node. This acknowledgment includes an indication as to whether the responding node's PCI/MC adapter is in a hardware error state. The TE, transmit/enable, field is set to indicate whether writes to the corresponding page of MC address space is transmitted over the network 10. When the TE field is set, write to the corresponding page are sent. When the TE field is clear, writes are not sent to the corresponding page. The STAE, suppress-transmit-after-error, field is set to cause a transmitting node in the network 10 to suppress transmission of writes to the corresponding page of MC address space while the PCI/MC adapter of a transmitting node is in a hardware error state.

Following are the descriptions of the receiver control bits of FIG. 3. The RE, receive/enable, field is set to allow any writes received by a node from the network to that page of the MC address space to be accepted. When the RE field is not set, writes to that node for that particular page of MC address space are not accepted. When the IOW, interrupt-on-write, field is set, the PCI/MC adapter of the receiving node will cause an interrupt signal to be sent to interrupt the processing of the CPU at the receiving node. When the SRAE, the suppress-receive-after-error, field is set on a receiving node, the PCI/MC adapter at the receiving node stops accepting data to pages for which this bit is set while the PCI/MC adapter is in a hardware error state.

Using the foregoing PCT bits, the various nodes (12a–12d) in the computer system control how data is filtered by the Memory Channel™. In other words, each node uses these control bits to control how data operations associated with a particular page of memory mapped to an address in the MC address space 32 are handled depending on whether the node is receiving or transmitting that particular page of data.

In this preferred embodiment, the page of MC address space which includes the error counters has its corresponding PCT bit settings as indicated below. Note that "0" indicates the bit field is "clear", and a setting of "1" implies the bit field is "set".

| | |
|---|---|
| DST = 0 | RE = 1 |
| BDCST = 1 | IOW = 0 |
| LPBK = 1 | SRAE = 0 |
| ACK = 1 | |
| TE = 1 | |
| STAE = 0 | |

It should be noted that in this particular embodiment, the Memory Channel™ (MC) by Digital Equipment Corporation is used as the communication mechanism by which nodes in network community 10 of FIG. 1 communicate and access a common address space. Use of the MC is preferred over other methods of node communication due to certain properties which the MC possesses. For example, during operation, the protocol used with the MC is virtually invisible to the nodes in the network 10 because the writes to the MC address space appear as simple writes to memory. Elaborate protocols are not required for communication.

Another property of the MC is the guaranteed ordering of writes. In other words, using the MC as a means for communication guarantees that all nodes in the network 10 will see the same specific order of writes applied to an area of MC address space 32. Referring to the previously described embodiment using the MC hub 24 of FIG. 1, all write operations are transmitted from the MC hub to receiving nodes in a particular order, and it is this particular order in which the nodes see the writes applied to an area of MC address space 32.

A second MC characteristic which is important is the fact that longword writes are atomic. Generally, the network communication and hardware of the system 10 guarantees that write operations are atomic for at least the size of an error counter value. The size of an error counter value should be large enough to store the number of reasonably expected errors. Thus, other possible data sizes for an atomic write operation besides "longword" maybe used in preferred embodiments in accordance with an approximation of the expected number of errors.

A third MC characteristic which is important is the functionality provided by the STAE, SRAE, and ACK control bit fields. In particular, when the PCI/MC hardware adapter is in an error state, having the SRAE and STAE bits set suppress further data transmission once an error has occurred. The ACK bit functionality is used to provide information to a transmitter that a receiver has successfully received data. Use of the characteristics and functionality provided by these control bit fields is described in paragraphs that follow. Other mechanisms, hardware or software, may be used to provide functionality equivalent to that of the foregoing STAE, SRAE, and ACK control field bits.

Thus, although the previously described embodiment includes the Memory Channel™, another means of communication between nodes in the network 10 may be used if that means of communication provides for guaranteed ordering of writes, atomic writes in accordance with the size of the approximate number of errors, non-local and node-local read and write operations, and the functional equivalent of the ACK, STAE, and SRAE control field bits.

In paragraphs that follow, described is a technique for error detection and error management in data transmission and receipt in the network 10.

Figure 4A:
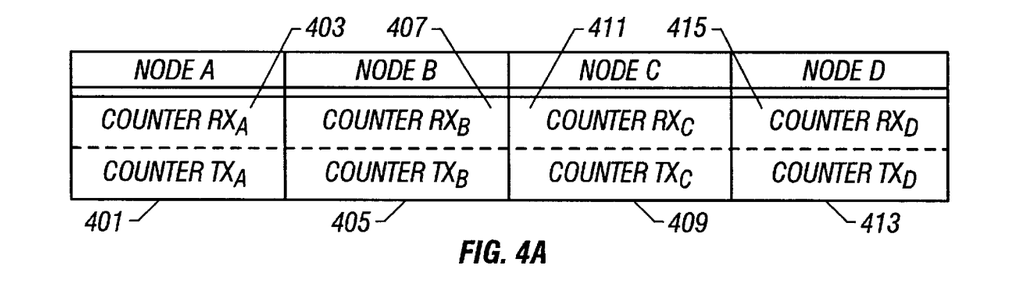
FIG. 4A is a block diagram of an embodiment of a partitioned error counter.

Referring now to FIG. 4A, shown is a block diagram of an embodiment of an error counter vector. In accordance with the four nodes in the network 10 of FIG. 1 (12a–12d), each node has two counters associated with it: a transmit error counter (identified by the abbreviation TX) and a receive error counter (identified by the abbreviation RX). In FIG. 4, each pair of counters is labeled according to the node it represents, i.e., Node A corresponds to node 12a (counters $RX_A$ 403 and $TX_A$ 401 ), Node B corresponds to node 12b (counters $RX_B$ 407 and $TX_B$ 405), Node C corresponds to node 12c (counters $RX_C$ 411 and, $TX_C$ 409), and Node D corresponds to node 12d (counters $RX_D$ 415 and $TX_D$ 413). While the counters for only four nodes are shown in the FIG. 4, those skilled in the art will understand that this arrangement may be used with any different number of nodes, with each node having two counters associated with it. For each counter, enough bits of memory are allocated such that, given the frequency of transmission errors, the maximum number representable by the counter will not be reached in any reasonably foreseeable lifetime of the system. In the preferred embodiment, for example, if MC transmission errors average several per year in a normal system application, then a 16-bit or a 32-bit memory location for each counter is generally sufficient. Recall that a requirement of the network 10 is that atomic writes in the network 10 are guaranteed at a minimum for a data item with a size of an error counter memory location.

Having separate error counters for each of the corresponding nodes in the network 10 provides significant advantages over prior art methods using a summary error counter. Error detection using the error counter vector of FIG. 4A utilizes the property of the MC adapter on each node that it independently reports both receive and transmit errors. This information recorded in the error counter vector of FIG. 4A provides identification of the particular node and the direction (transmit or receive) of the data transmission error. This information regarding the particular nodes and direction may be used, for example, in error recovery during data retransmission. The more detailed information enables more detailed problem isolation as to which nodes require retransmission. This is in contrast with all nodes retransmitting all data to all nodes in the network 10 when summary error counter information is used in error recovery, as in prior art systems, as opposed to the error counter vector having multiple error counters of FIG. 4A.

Figure 4B:
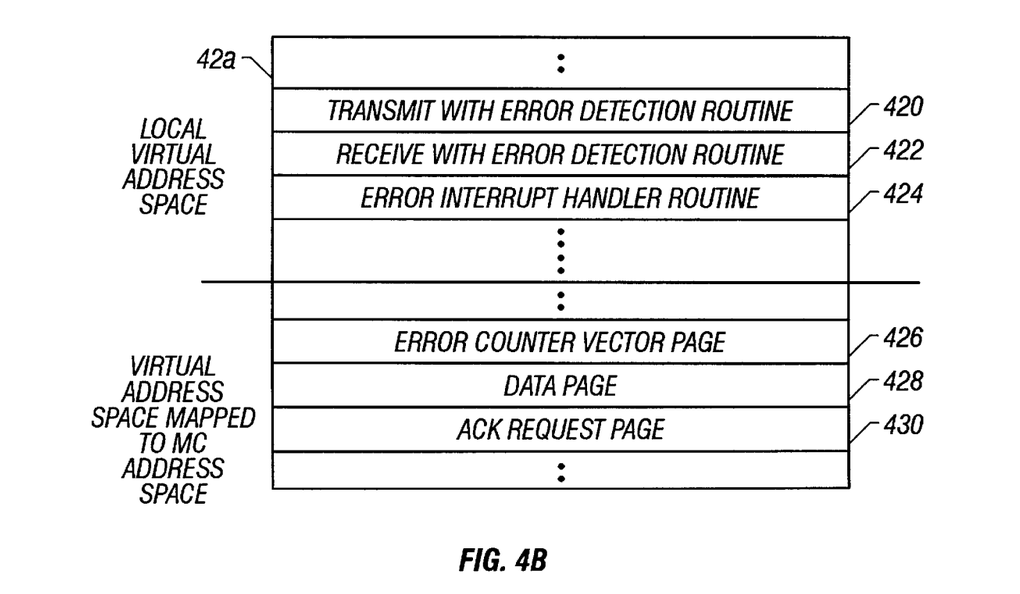
FIG. 4B is a block diagram of an embodiment of virtual memory address space in a node of the network of FIG. 1.

Referring now to FIG. 4B, shown is a block diagram of an embodiment of virtual address space in node 12a of the computer system of FIG. 1. The virtual address space of node 12a is shown as including various routines used in performing error detection using the error counter of FIG. 4A. These routines are a transmit with error detection routine 420, a receive with error detection routine 422, and an error interrupt handler routine 424. The transmit with error detection routine 420 sends a data transmission. The receive with error detection routine 422 is executed on a node when the node receives a data transmission. The error interrupt handler routine 424 is invoked when an error interrupt is raised signaling a data transmit or receive error. Such an error interrupt may be raised, for example, when an error bit is set by the PCI/MC adapter of a node. Each of these routines (420, 422, and 424) is discussed in more detail in paragraphs that follow.

Also shown in FIG. 4B are pages of virtual memory address space 42a which are mapped to MC address space. These pages are the error counter vector page 426, the data page 428, and the ACK request page 430. The error counter vector page 426 contains the error counter vector of FIG. 4A. The data page 428 includes data that is sent in a transmission between nodes in the network 10. The ACK request page includes a "dummy" data area using the functionality of the ACK bit set for this page to signal receipt of a data transmission. The data page 428 and the ACK request page 430 will be described in conjunction with other Figures.

It should be noted that although FIG. 4B shows the virtual address space only for node 12a of FIG. 1, the virtual address spaces of nodes 12b–12d are similarly structured to include the foregoing routines to perform error detection using the error counter vector of FIG. 4A.

It should be noted that the particular arrangement of items in virtual memory 42a may vary with implementation and instantiation of the invention. The particular arrangement of FIG. 4B is not to be construed as limiting the location in virtual memory of the various components described herein.

Figure 5:
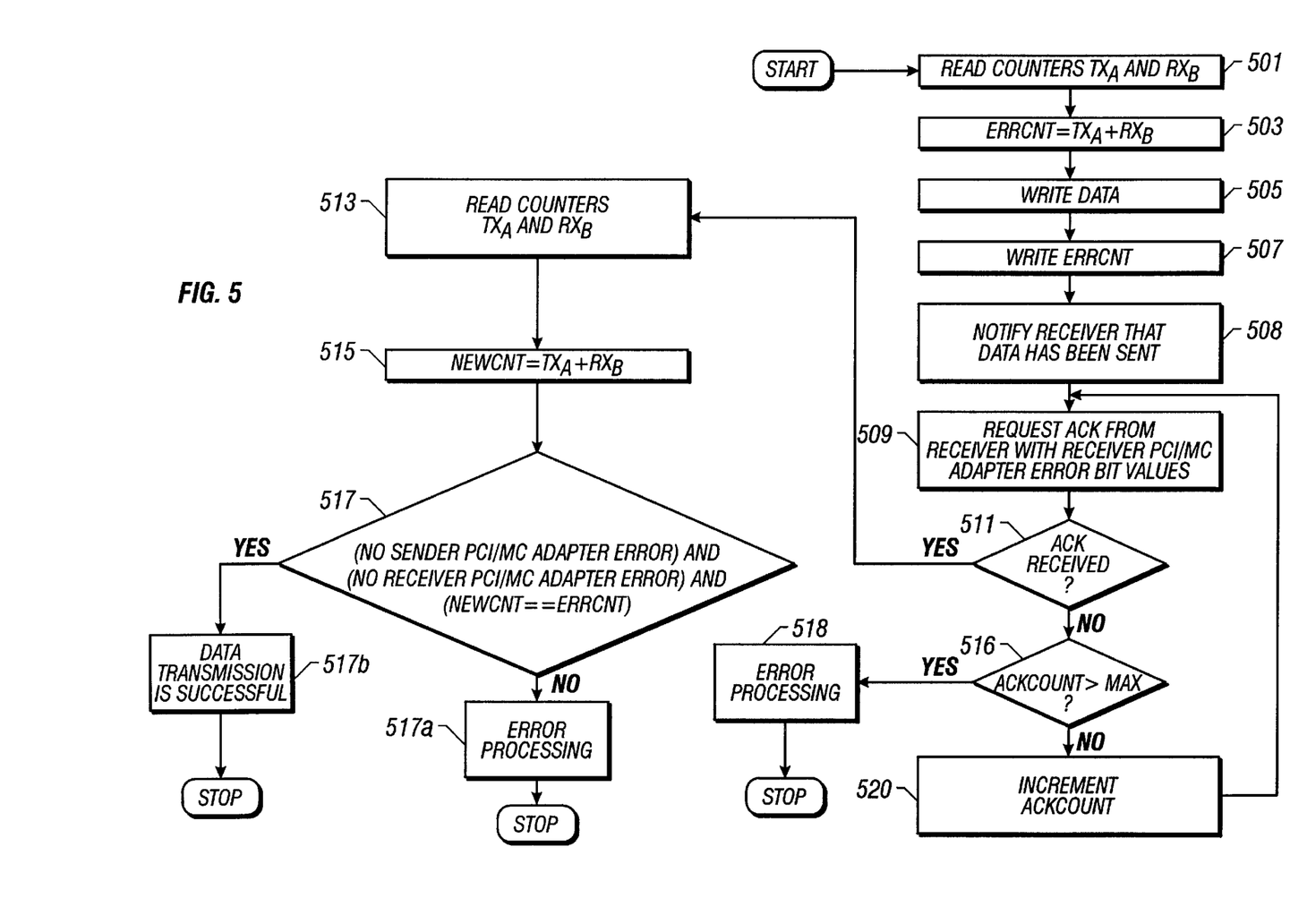
FIG. 5 is a flow chart depicting method steps of an embodiment of a transmit with error detection routine of FIG. 4B.

Referring now to FIG. 5, shown is a flow chart depicting method steps of an embodiment of a transmit with error detection routine of FIG. 4B. The following description of the transmit with error detection routine uses, as an example, a data transfer from a first node (Node A) to a second node (Node B). Those skilled in the art will recognize that this example is representative of any data transfer from one node to another. In FIG. 5, the transmit with error detection routine at Node A reads, in step 501, the values of counters $TX_A$ and $RX_B$ (indicated graphically in FIG. 4 as counters 401 and 407, respectively). These are the copies of the counters as stored in the memory of Node A. In step 501, these counter values are read from the error counter vector until it is determined that the counter values are "valid" or non-blackout values. Generally, a black-out value is a special value to which a first node's error counter is set by the first node's interrupt handler when updating the first node's counters. The blackout value indicates to a second reader node that the first node's error counters are invalid and data sent to the first node may not be successfully received if data transmission begins prior to the first node's adapter error bits being reset. It should be noted that these adapter error bits are included in the LCSR status register previously described. Further uses of the blackout value and the interrupt handler in this embodiment are described in paragraphs that follow.

In step 503, a value Errcnt is determined as the sum of counters $TX_A$ and $RX_B$. This sum is later tested against the sum of the two counters read after the data transfer is complete to determine whether either of the counters was incremented during the data transfer.

In step 505, the data to be transferred from Node A to Node B is written to the appropriate region of MC address space of Node A. This region may be, for example, the data page 428 of FIG. 4B. At the end of this data transfer, a write operation is performed (step 507) in which Node A transfers the error counter values initially read by Node A in step 501 to Node B. To accomplish this, the error counter values (Errcnt) are written, for example, to the data page 428. At step 508, the receiver is notified that the data and Errcnt have been sent.

Figure 6:
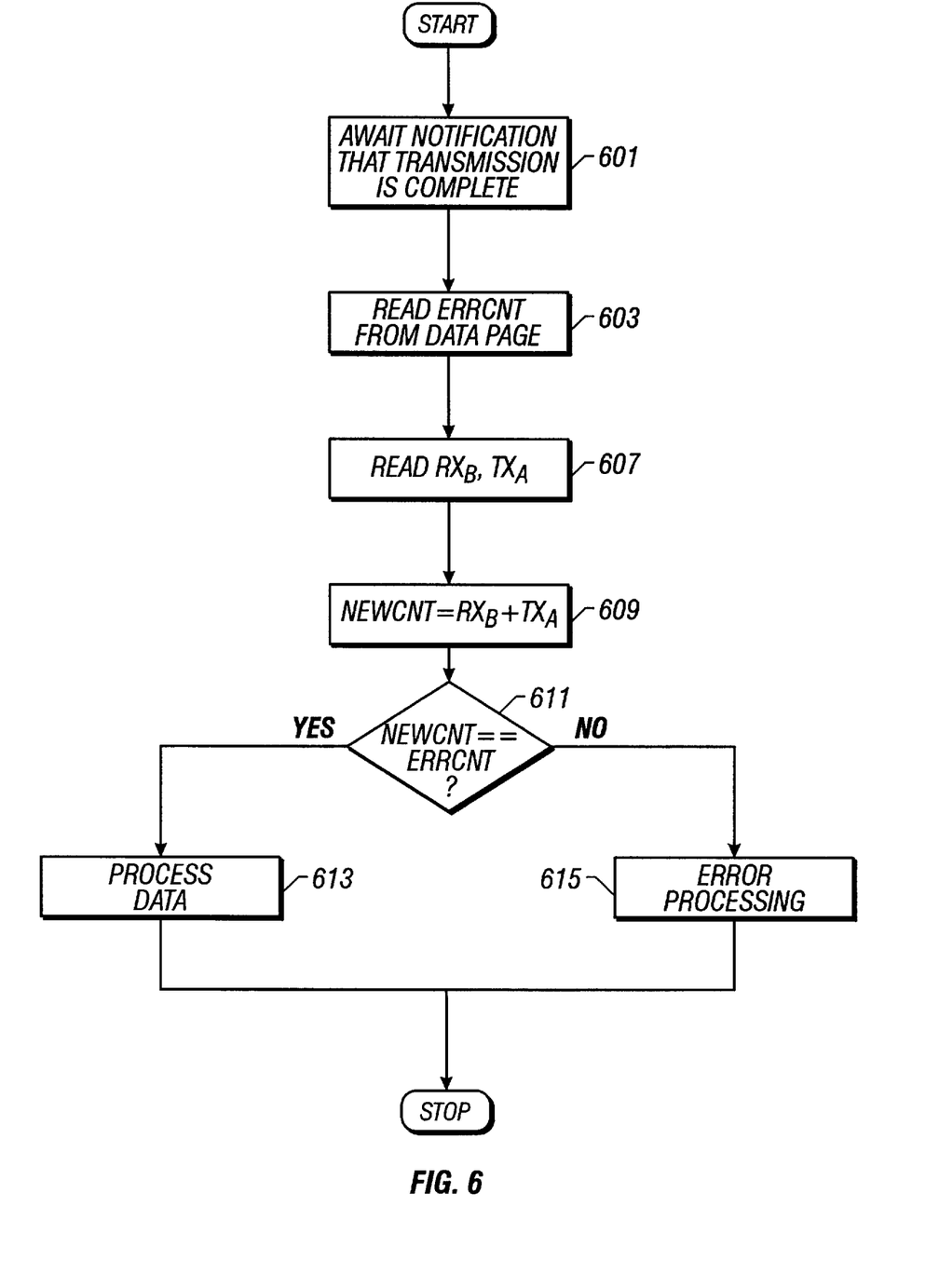
FIG. 6 is a flow chart depicting method steps of an embodiment of a receive with error detection routine of FIG. 4B.

As will be further described in conjunction with FIG. 6, Node B is notified of the completed data transmission by generation of an MC interrupt for the MC adapter of Node B, or by alternatively polling the data area for a "flag", e.g., a specific value in a field to indicate completed transmission. For polling, a "flag" value may be written by Node A at step 508 to a page of MC address space for receiving nodes to read, for example, in data page 428. Alternatively, an interrupt may be generated, for example, by writing to another "dummy" data area in which the IOW (interrupt-on-write) PCT bit is set. This other "dummy" data area may be located on a fourth page (not shown in FIG. 4B).

At step 509, an ACK is requested from the receiver. In this embodiment, when the sender receives the ACK, the sender additionally receives the status of the receiver's PCI/MC adapter error bits which are used in step 517. The ACK request is made by the sender writing any value to a "dummy" data area included in the ACK request page 430 of FIG. 4B. The ACK request page 430 has its ACK bit set to achieve this behavior. Note that in this preferred embodiment the dummy data area in page 430 is in a page of virtual memory separate from both the error counter vector (page 426) and the data transmitted (page 428). Otherwise, the receiver would receive an ACK request for each write of the data transmission or the error counter vector.

Node A waits for an acknowledgment from the receiving node at step 511. If the acknowledgment is received within a predetermined time limit, control proceeds to step 513 in which the two error counters involved in the transfer (i.e. counters $TX_A$ and $RX_B$) are read. A value newcnt is initialized in step 515 as the sum of the two error counter values read in step 513.

At step 517, a determination as made as to whether newcnt is equal to Errcnt, and whether there were any sender or receiver MC adapter errors. Receiver adapter error are detected by using the information received in the ACK response. A determination is made as to whether there are any adapter errors on the sending node by examining the LCSR on the sending node, as previously described in conjunction with FIG. 1. If there was any incrementing of either Node A's transmit error counter or Node B's receive error counter during the data transfer, newcnt would be higher then Errcnt. Therefore, Node A tests the value of newcnt against the value of Errcnt to determine whether there has been an error during the data transfer. If step 517 determines that there were no adapter or data transfer errors reported, control proceeds to step 517b at which the data transmission is deemed to be successful, and the routine ends. However, if step 517 determines that there has been a data transfer or an adapter error, control proceeds to step 517a where error processing is performed. It should be noted that error processing may include a wide range of alternatives, such as data retransmission, in accordance with each particular network 10.

If at step 511, the acknowledgment from the other node is not detected within the predetermined time limit, control proceeds to step 516 at which Node A checks a counter ackcount to determine whether the number of times it has issued an acknowledgment request and not received answers from all the nodes has reached a predetermined maximum (MAX). If not, ackcount is incremented in step 520, and control is returned to step 507. If, in step 516, the maximum number of attempts has been reached, error processing is invoked at step 518. Similar to the characterization of error processing from step 517a, the range of error processing alternatives of step 518 may vary with network and computer systems. At part of error processing and recovery, one preferred embodiment may attempt to correct for the absence of the acknowledgment from the other node by creating a node community of only responsive nodes.

A receiving node of a data transfer detects and handles a data transfer error using the partitioned counters of the present invention. Accordingly, referring now to FIG. 6, shown is an embodiment of a method of a receive with error detection routine of FIG. 4B. The method steps of FIG. 6 demonstrate the manner in which program code at each node handles error detection when that node is the destination node during a data transfer. As with the previous description of the source node error detection of FIG. 5, FIG. 6 is described in paragraphs that follow with reference to a transfer from a first node, Node A (source node), to a second node, Node B (destination node). Thus, the routine depicted in FIG. 6 is executed when one of the nodes in the network 10 is a destination node of a data transfer.

While the data to be transferred is being written to a designated shared memory location, at step 601 Node B awaits notification from that the data transmission is complete. As previously described, this can be accomplished using several alternative mechanisms known to those skilled in the art. For example, a "polling" approach may be used in which Node B continuously monitors a predetermined location for a "flag" value to determine when the error counter values are received, as described in conjunction with step 508. Alternatively, an interrupt mechanism may prove more efficient in a preferred embodiment, such as when the IOW bit functionality is used as also previously described in conjunction with step 508.

After receiving notification by Node A that data transmission is complete, Node B reads the value of Errcnt received in data transmission, as in step 603, providing Node B with the original sum of Node A's transmit error counter and Node B's receive error counter, as read by Node A. Node B reads the current values of counters $TX_A$ and $RX_B$ in step 607 and, in step 609, sums them together to get the value newcnt. The value of newcnt is then tested against the Errcnt to determine whether either of the two counters in question were incremented during the data transfer of step 611. If newcnt is equal to the original sum, then no errors were reported. Subsequently, the data is processed in step 613, and the routine terminates. However, if newcnt is not equal to the Errcnt (the original sum), an error occurred and control proceeds to step 615 where error processing is performed. Appropriate error processing actions may include, for example, Node A resending the data after detecting that an error has occurred.

Figure 7:
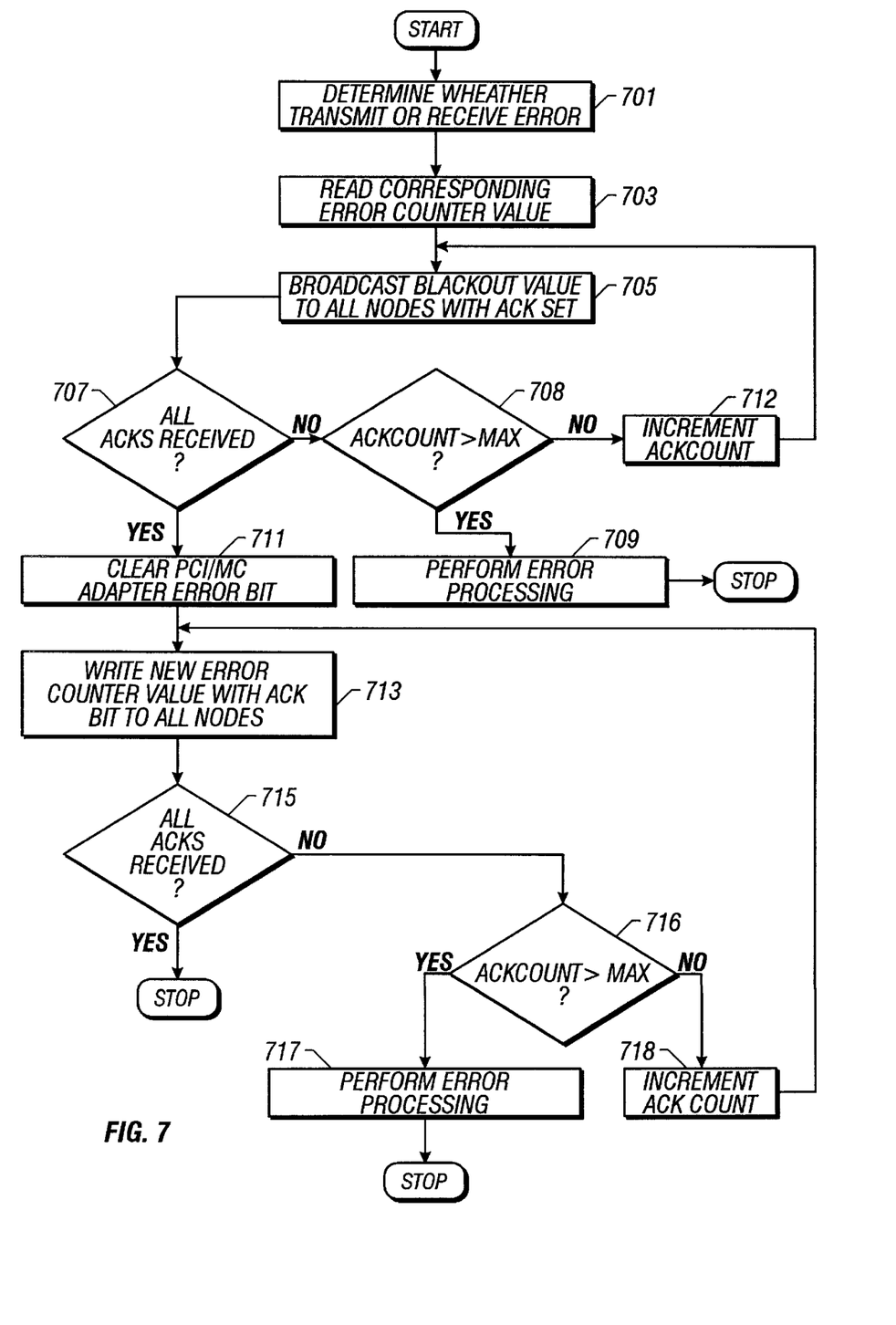
FIG. 7 is a flow chart depicting method steps of an embodiment of an error interrupt handler routine of FIG. 4B.

Referring now to FIG. 7, shown is a flow chart depicting method steps of an embodiment of an error interrupt handler routine of FIG. 4B. When a PCI/MC adapter error bit for a node is set, the error interrupt handler routine first determines whether the error was a transmit error or a receive error in step 701, based on whether it was the transmit error bit which was set or the receive error bit. Note that these bits are those previously described as the LCSR status bits.

The corresponding counter (i.e. transmit error counter or receive error counter) is read in step 703 from the error counter vector page 426. In step 705, a "blackout value" for this error counter is broadcast to all the nodes in the network before the recovering node executing its error interrupt handler routine continues with steps of FIG. 7. By broadcasting the special blackout value to the other nodes, the recovering node communicates that it is in the process of error recovery and its error counter values are "invalid" and its PC/MC adapter bits need to be reset for any further data transmissions to occur between the recovering node and another node in the network 10. In this embodiment, a recovering node sets its error counters to a blackout value, resets its PCI/MC adapter bits to re-enable data transmission/receipt, and then writes non-blackout values to its error counters. Thus, when there is a non-blackout value in a recovering node's error counters, the recovering node is capable of sending and receiving data. If a sending node, such as in performing step 501, does not wait until a valid, non-blackout value is read from a receiving node's error counters, data may be "lost" in that the receiving node may not have yet recovered from a previous error by resetting its status bits to enable receipt of data transmissions. Broadcasting a blackout value to other nodes corrects the problem of possibly having this data loss.

To create the necessary blackout condition, the recovering node modifies the value in the appropriate counter (i.e. transmit or receive counter) to a value which indicates to the other nodes that it is in an error state. In this preferred embodiment, this is done by writing a value to the error counter which sets the sign bit of the counter making the number it represents a negative value. The writing of this value is done with an acknowledgment (ACK) request so that the recovering node receives back an acknowledgement from all receiving nodes. The recovering node waits for the acknowledgments from the other nodes in step 707, and proceeds once they have all been received. If all acknowledgments have not been received, control proceeds to step 708 in which the node checks counter ackcount to determine whether the number of times it has issued an acknowledgment request and not received answers from all the nodes has exceeded a predetermined maximum. (It will be understood that the labels for counters herein are for descriptive purposes only. Furthermore, all counters are initialized prior to their first use for a particular purpose).

If counter ackcount has not exceeded the maximum count in step 708, ackcount is incremented in step 712, and control returns to step 705. If at step 708 the maximum number of attempts has been exceeded, error processing is performed. As previously described, the error processing may include a node recovery routine which attempts to correct for the absence of a complete set of acknowledgments from the other nodes by creating a node community of only responsive nodes. As part of the node's recovery routine, if the node recovery is successful, control may subsequently return to step 705.

Once all the acknowledgments have been received from the other nodes, the recovery routine clears the PCI/MC adapter error bit of the recovering node in step 711. This prevents the error interrupt handler routine from being again invoked immediately after the routine terminates. Clearing the error bit also allows data transfers to continue for pages in the MC address space with SRAE bits set (i.e., to not suppress receiving of data after an error). In step 713, the incremented counter value is written to the appropriate counter location replacing the blackout value (i.e., the value with the sign bit set). This write operation is also done with an acknowledgment request (ACK bit set). At step 715, the recovering node waits for the other nodes to acknowledge receipt of the new value. If all of the acknowledgments are received in step 715, the interrupt routine thereafter terminates. If, however, all acknowledgments have not yet been received, control proceeds to step 716 in which the node checks counter ackcount to determine whether the number of times it has issued an acknowledgment request and not received answers from all the nodes has exceeded a predetermined maximum.

If counter ackcount has not exceeded the maximum count in step 716, ackcount is incremented in step 718, and control is returned to step 713. If however, in step 716, the maximum number of attempts has been reached, error processing is once again performed, similar to the error processing described for step 709.

Below is a C-style pseudo-code description of the foregoing method steps of FIGs. 5, 6, and 7 with additional modifications for execution in a node having a processor based upon the Alpha™ architecture by Digital Equipment Corporation™ as described in the Alpha Architecture Reference Manual by Digital Press. In the description, the special notation "<==" denotes an assignment to an address in the MC address space shared between nodes of the network 10.

```
/* The error counter arrays are realized by the following
   C-style declarations: */
        #define BLACKOUT 0 x 80000000; /* Sign bit. */
        typedef struct {ACKBYTE responses[60];
              int32 errors;
              }ECOUNTER;
        typedef struct {ECOUNTER transmit;
           ECOUNTER receive;
           }EC_PAIR;
```

-continued

```
        typedef struct {EC_PAIR node [MAXNODES];
        ACKBYTE end_chk_ack[60];
        uint32 end_chk_request;
        }EC_PAGE;
/* Each transmit or receive error counter has the initial value 0 for
nodes not members of the community and 1 for member nodes. */
/**********************************************************/
    SendWithErrorDetection( )
{
/** CORRESPONDS TO FIG. 5
        Below is a declaration for the error counters located in the MC
        address space shared by nodes in the network 10 of FIG. 1 */
    EC_PAIR            *my = & ec_page.node[my_node_id];
    EC_PAIR            *dst = & ec_page.node[remote_node_id];
/* The transmitter reads initial values for its transmit error count
and the receivers receive error count before beginning to write memory
channel data. When finished, it writes these initial values to the
receiver so that the receiver can use them when it reads the counters
after receiving the data. Then, the transmitter requests an ACK to
determine the status of the error summary bits on the remote adapter
and then re-reads the error counter values.
    The transmitter performs the ACK before reading the counters,
because the error interrupt routine modifies the relevant error counter
before resetting the summary bits. Since the transmitter reads its
transmit error count and the receiver's receive error count, it will
not pessimistically conclude that the data did not arrive if the
receiver had experienced a transmit error during the transfer.
    The "blacked-out" value is necessary initially to avoid missing an
error if the transmitter reads an incremented value and begins
transmitting before the adapter error bits have been reset. Data sent
during this period is discarded by the adapter and not received. If
the transmitter then re-reads the error counters and compares the
values to those previously read, it will falsely assume there has been
no error. Thus, the following transmit code does not record snapshot
values for the counters until it finds them positive (not blacked out).
**********************************************************/
        int tecSnapshot,    /* transmit error count */
            recSnapshot;    /* receive error count */
        /* A snapshot of the value: my->transmit.errors + dst->receive.errors
         * must be taken before any RM data is written..
         */
        /* must have positive, non-Blackout counter values */
        while (0 > tecSnapshot = my->transmit.errors);
        while (0 > recSnapshot = dst->receive.errors);
        {write data to memory channel region pointed to by dataArea}
        MB( );   /* Ensure all data present when end marker written
                 /* Alpha MB instruction to synchronize            *
                    memory access **/
        dataArea->EC <== tecSnapshot + recSnapshot; /* for receiver check and */
                                           /* show transmit complete */
        {Notify receiver that data arrived, e.g. write an interrupt . . . }
        RequestAck(dst);
        {wait until all node ack responses are reported
        if ( ! transmitError       /* check own adapter status */
            && {ACK is receive-error-free }    /* remote adapter status */
            && dst->receive.errors > 0        /* both error counter */
            && my->transmit.errors > 0         /* values are valid */
                                        /* and still have old values */
            && dst->receive.errors + my->transmit.errors
                        == tecSnapshot + recSnapshot) {
                /* If check passes, transmitter knows data arrived ok */
            }else {
                {perform error handling actions }
            }
        }
}
/**********************************************************
    ReceiveWithErrorDetection( )
/** CORRESPONDS TO FIG. 6
        The receiver, interacting with the preceeding transmitter code, can be
        sure that the data it accepts is complete and error free.
        Since the receiver reads its receive error count and the transmitter's
        receive error count, it will not pessimistically conclude that the data
        did not arrive if, for example, it had experienced a transmit error
        during the transfer. **/
        {
        EC_PAIR             *my = & ec_page.node[my_node_id];
        EC_PAIR             *src = & ec_page.node[remote_node_id];
        if (dataArea->EC == my->receive.errors + src->transmit.errors) {
            {If check passes, receiver knows data ok so process data }
```

-continued

```
        }else {
            {perform error recovery actions }
        }
    }
/**********************************************************************
/
    error_interrrupt (community)
    {
    /** CORRESPONDS TO FIG. 7 ***
        Error counter updates are performed by the following interrupt
    routine. The interrupt routine does not need to synchronize access to
    the error counter values because it only modifies the value(s) for the
    node on which it is executing. Since transmit and receive errors are
    counted separately, no information is lost. **/
    EC_PAIR            my = & ec_page.node[my_node_id];
    int my_node_id;   /* constant value is index of current node */
    EC_PAGE ec_page;   /* error counter page in memory channel space */
        int tctmp, rctmp;
        if (receive_error) {
            rctmp = my->receive.errors + 1 | BLACKOUT; /* sum with sign bit */
            clear_ack_bytes(& my->receive.responses);
            my->receive.errors <== rctmp;      /* causes ack request */
        }
        if (transmit_error) {
            trtmp = my->transmit.errors + 1 | BLACKOUT; /* sum with sign bit */
            clear_ack_bytes(& my->transmit.responses);
            my->transmit.errors <== trtmp;      /* causes ack request */
        }
        retry_count = 0;
        do {
            wait for loopback and acks from all community members
            if (ACK shows count did not arrive)
                retry_count++;
            else break;
            if (receive_error) {
                clear_ack_bytes(& my->receive.responses);
                my->receive.errors <== rctmp;      /* causes ack request */
            }
            if (transmit_error) {
                clear_ack_bytes(& my->transmit.responses);
                my->transmit.errors <== trtmp;      /* causes ack request */
            }
        }while (acks_not_back && retry_count < too_many);
        if (retry_count == too_many) CrashSelf( )
        /* Now, turn off adapter error bits and then write un-blacked out
           error counter value */
        if (receive error)
           clear_adapter(receive_error);
        if (transmit error)
           clear_adapter(transmit_error);
        if (receive_error) {
           rctmp = rctmp ^ BLACKOUT;         /* flip sign bit back */
           clear_ack_bytes(& my->receive.responses);
           my->receive.errors <== rctmp;      /* causes ack request */
        }
        if (transmit_error) {
           trtmp = trtmp ^ BLACKOUT;         /* flip sign bit back */
           clear_ack_bytes(& my->transmit.responses);
           my->transmit.errors <== trtmp;      /* causes ack request */
        }
        retry_count = 0;
        do {
            wait for loopback and acks from all community members
            if (ACK shows count did not arrive)
                retry_count++;
            else break;
            if (receive_error) {
               clear_ack_bytes(& my->receive.responses);
               my->receive.errors <== rctmp;      /* causes ack request */
            }
            if (transmit_error) {
               clear_ack_bytes(& my->transmit.responses);
               my->transmit.errors <== trtmp;      /* causes ack request */
            }
        }while (acks_not_back && retry_count < too_many);
        if (retry_count == too_many ) CrashSelf( )
    }
```

The foregoing description affords a flexible and efficient technique for performing error detection and handling in a computer system. The foregoing technique can easily be used in a particular implementation in accordance with a variety of operating systems and computing system environments while simultaneously providing efficient and detailed error information about data transmissions.

The techniques used in the previously described preferred embodiment generally improve efficiency over prior art techniques by using an error counter data structure shared by nodes in a network without requiring global locking to synchronize access to the shared error counter. The use of node-specific error counter information preserves information which is typically used for more efficient error recovery when a data transmission fails for a variety of reasons.

Having described preferred embodiments of the invention, it will now become apparent to those skilled in the art that other embodiments incorporating its concepts may be provided. It is felt, therefore, that this invention should not be limited to the disclosed embodiments, but rather should be limited only by the scope of the appended claims.

What is claimed is:

1. A method of performing error detection during a communication between a first node and a second node of a shared memory network system having a plurality of processing nodes, the method comprising:

maintaining, at each of the processing nodes, a set of error counts, each of the sets comprising a plurality of individual error counts, each of which is exclusive to a particular one of the nodes such that it indicates a number of errors detected at only its particular node;

examining, by the first node, first and second error counts of the set of error counts maintained at the first node to determine whether either the first or the second error count was incremented during the communication, wherein the first error count is exclusive to the first node and the second error count is exclusive to the second node; and initiating, if either the first error count or the second error count was incremented during the data communication, an error recovery procedure which uses the first and second error counts in performing error recovery.

2. The method of claim 1 wherein the error recovery procedure uses the first and second error counts to determine and to retransmit any data lost during the communication between the first node and the second node.

3. The method of claim 1, wherein the communication is also between the first node and a third node, the third node comprising one of the plurality of individual processing nodes, the third node being associated with a third error count comprising one of the plurality of individual error counts, and wherein the error recovery procedure uses the first, second and third error counts in determining, initiating, and performing error recovery.

4. The method of claim 1, wherein the shared memory network system guarantees an atomic write of at least the size of the first error count.

5. The method of claim 1, wherein the shared memory network system guarantees write ordering of write operations in accordance with an order in which they are received by a communication medium in the shared memory network system from a sending node, the communication being sent from the first to the second node using the communication medium.

6. The method of claim 1, wherein each of the processing nodes is only allowed to write to its own associated error count and may read other error counts associated with others of the processing nodes.

7. The method of claim 6, further comprising accessing to the first and second error counts without using global synchronization routines, the first and second error counts being shared by the first and second nodes.

8. The method of claim 7, wherein the global synchronization routines include a lock and an unlock operation, the lock operation granting a requesting node exclusive access to a shared resource and blocking other requesting nodes, the unlock operation releasing control of a shared resource for use by other requesting nodes.

9. The method according to claim 1, wherein maintaining a set of error counts at each of the nodes further comprises maintaining at each of the nodes a copy of the same set of error counts which is updated at each of the nodes via the network when a value of any of the error counts is modified.

10. The method according to claim 1, wherein examining the first and second error counts comprises examining a sum of the first and second error counts.

11. The method according to claim 1, wherein the first error count comprises a count of transmission errors at the first node, and the second error count comprises a count of receiving errors at the second node.

12. The method according to claim 1 further comprising communicating the values of the first and second error counts from the set of error counts maintained at the first node to the second node.

13. The method according to claim 1, wherein communicating the first and second error counts to the second node further comprises writing, by the first node, the first and second error counts to a predetermined shared memory location, such that when the first and second error counts are written, the new data in the predetermined shared memory location indicates to the second node that a communication of previous data is complete.

14. The method according to claim 1, wherein communicating the first and second error counts to the second node further includes generating an interrupt to notify the second node that a communication of previous data is complete.

15. The method according to claim 12, further comprising comparing, by the second node, the values of the first and second error counts communicated from the first node to the values of first and second error counts of the set of error counts maintained at the second node that correspond to errors detected at the first and second nodes, respectively.

16. The method according to claim 15, further comprising initiating the error recovery procedure by the second node if the values of the first and second error counts communicated from the first node and the values of first and second error counts of the set of error counts maintained at the second node are not the same.

17. The method according to claim 12, wherein communicating the values of the first and second error counts from the set of error counts maintained at the first node to the second node, comprises communicating, from the first node to the second node, a sum of the values of the first and second error counts from the set of error counts maintained at the first node.

18. The method according to claim 1, wherein examining first and second error counts of the set of error counts maintained at the first node further comprises comparing values of the first and second error counts from a time prior to a transfer of data from the first node to the second node, to values of the first and second error counts from a time subsequent to the transfer of data from the first node to the second node.

19. The method according to claim 1, wherein maintaining a set of error counts at each of the nodes comprises maintaining a set of error counts at each of the nodes such that each individual error count of a set is exclusive to a particular node, and to either a transmission error or a receiving error at that node.

20. The method according to claim 19, wherein each set of error counts includes a transmission error count and a receiving error count for each of the nodes.

21. The method according to claim 20 wherein, when an error is detected at the first node which occurred during the transmission from the first node to the second node, the method further comprises incrementing, at the first node, the error count corresponding to a transmission error at the first node.

22. The method according to claim 21 wherein, when an error is detected at the second node which occurred during the transmission from the first node to the second node, the method further comprises incrementing, at the second node, the error count corresponding to a receiving error at the second node.

23. The method according to claim 21 wherein, prior to incrementing the transmission error counter at the first node, a blackout value is stored in the transmission error counter at the first node, the blackout value being a value which indicates to other nodes of the system that the first node is in error recovery and prevents attempts by other nodes to communicate with the first node.

24. A method of performing error detection during network communication including a data transfer between a first node and a second node of a shared memory net work system having a plurality of individual processing nodes, the method comprising:

maintaining, at each of the processing nodes, a set of error counts, each of the sets comprising a plurality of individual error counts including a transmitting error count and a receiving count for each of the nodes, the error counts of each set being updated via the network when any of the error counts is modified;

examining, by the first node, first and second error counts of the set of error counts maintained at the first node to determine whether either the first or the second error count was incremented during the data transfer, wherein the first error count represents a count of transmitting errors at the first node and the second error count represents a count of receiving errors at the second node;

communicating the values of the first and second error counts, as they were prior to the data transfer, from the first node to the second node;

examining, by the second node, first and second error counts of the set of error counts maintained at the second node which represent, respectively, a count of transmitting errors at the first node and a count of receiving errors at the second node, and comparing them with the values of the first and second error counts received from the first node, to determine whether there is a difference in the values of the first and second error counts detected received from the first node and the first and second error counts of the set of error counts maintained at the second node;

initiating an error recovery procedure by the first node if either the first error count or the second count of the set of error counts maintained at the first node was incremented during the data transfer, the error recovery procedure resulting in the retransmission of any data lost during communication between the first node and the second node; and initiating an error recovery procedure by the second node if there is a difference in the values of the first and second error counts received from the first node and the first and second error counts of the set of error counts maintained at the second node.

25. A computer program product for performing error detection during a communication between a first node and a second node of a shared memory network system having a plurality of processing nodes, the computer program product including program code comprising:

program code for maintaining, at each of the processing nodes, a set of error counts, each of the sets comprising a plurality of individual error counts each of which is exclusive to a particular one of the nodes such that it indicates a number of errors detected at only its particular node;

program code for examining, by the first node, first and second error counts of the set of error counts maintained at the first node to determine whether either the first or the second error count was incremented during the communication, wherein the first error count is exclusive to the first node and the second error count is exclusive to the second node; and program code for initiating, if either the first error count or the second error count was incremented during the communication, an error recovery procedure which uses the first and second error counts in error recovery.

26. The computer program product of claim 25, wherein the error recovery procedure uses the first and second error counts to determine and retransmit any data lost during communication between the first node and the second node.

27. The computer program product of claim 26, wherein the communication is also between the first node and a third node, the third node comprising one of the plurality of individual processing nodes, the third note being associated with a third error count comprising one of the plurality of individual error counts, and wherein the error recovery procedure uses the first, second and third error counts in determining, intiating, and performing error recovery.

28. The computer program product of claim 25, wherein the shared memory network system guarantees an atomic write of at least the size of the first error count.

29. The computer program product of claim 25, wherein the shared memory network system guarantees write ordering of write operations in accordance with an order in which they are received by a communication medium in the shared memory network system from a sending node, the communication being sent from the first to the second node using the communication medium.

30. The computer program product of claim 25, wherein each of the processing nodes is only allowed to write to its own associated error count and may read other error counts associated with others of the processing nodes.

31. The computer program product of claim 30, further comprising program code for accessing the first and second error counts without using global synchronization routines, the first and second error counts being shared by the first and second nodes.

32. The computer program product of claim 31, wherein the global synchronization routines include a lock and an unlock operation, the lock operation granting a requesting node exclusive access to a shared resource and blocking other requesting nodes, the unlock operation releasing control of a shared resource for use by other requesting nodes.

33. The computer program product according to claim 25, wherein the program code for maintaining a set of error counts at each of the nodes comprises program code for maintaining at each of the nodes a copy of the same set of error counts which is updated at each of the nodes via the network when a value of any of the error counts is modified.

34. The computer program product according to claim 25, wherein the program code for examining the first and second error counts comprises program code for examining a sum of the first and second error counts.

35. The computer program product according to claim 25, wherein the first error count comprises a count of transmission errors at the first node, and the second error count comprises a count of receiving errors at the second node.

36. The computer program product according to claim 25 further comprising program code for communicating the values of the first and second error counts from the set of error counts maintaining at the first node to the second node.

37. The computer program product according to claim 36, wherein the program code for communicating the first and second error counts to the second node comprises program code for writing, by the first node, the first and second error counts to a predetermined shared memory location, such that when the first and second error counts are written, the new data in the predetermined shared memory location indicates to the second node that a communication of previous data is complete.

38. The computer program product according to claim 36, wherein the program code for communication the first and second error counts to the second node further includes program code for generating an interrupt to notify the second node that a communication of previous data is complete.

39. The computer program product according to claim 36 further comprising program code for comparing, by the second node, the values of the first and second error counts communicated from the first node to the values of first and second error counts of the set of error counts maintained at the second node that correspond to errors detected at the first and second nodes, respectively.

40. The computer program product according to claim 39, wherein the program code for initiating an error recovery procedure further comprises program code for initiating an error recovery procedure by the second node if the values of the first and second error counts communicated from the first node and the values of first and second error counts of the set of error counts maintained at the second node are not the same.

41. The computer program product according to claim 36, wherein the program code for communicating the values of the first and second error counts from the set of error counts maintained at the first node to the second node, comprises program code for communicating from the first node to the second node a sum of the values of the first and second error counts from the set of error counts maintained at the first node.

42. The computer program product according to claim 25, wherein the program code for examining first and second error counts of the set of error counts maintained at the first node further comprises program code for comparing values of the first and second error counts from a time prior to a transfer of data from the first node to the second node, to values of the first and second error counts from a time subsequent to the transfer of data from the first node to the second node.

43. The computer program product according to claim 25, wherein the program code for maintaining a set of error counts at each of the nodes comprises program code for maintaining a set of error counts at each of the nodes such that each individual error count of a set is exclusive to a particular node, and to either a transmission error or a receiving error at that node.

44. The computer program product according to claim 43, wherein each set of error counts is such that it includes a transmission error count and a receiving error count for each of the nodes.

45. The computer program product according to claim 44 wherein, when an error is detected at the first node which occurred during the transmission from the first node to the second node, the program code further comprises program code for incrementing, at the first node, the error count corresponding to a transmission error at the first node.

46. The computer program product according to claim 45 wherein, when an error is detected at the second node which occurred during the transmission from the first node to the second node, the program code further comprises incrementing, at the second node, the error count corresponding to a receiving error at the second node.

47. The computer program product according to claim 45 further comprising program code that, prior to incrementing the transmission error counter at the first node, stores a blackout value in the transmission error counter at the first node, the blackout value being a value which indicates to other nodes of the system that the first node is in error recovery and prevents attempts by other nodes to communicate with the first node.

48. A computer program product for performing error detection during network communication including a data transfer between a first node and a second node of a shared memory network system having a plurality of individual processing nodes, the program code comprising:

program code for maintaining, at each of the processing nodes, a set of error counts, each of the sets comprising a plurality of individual error counts including a transmitting error count and a receiving count for each of the nodes, the error counts of each set being updated via the network when any of the error counts is modified;

program code for examining, by the first node, first and second error counts of the set of error counts maintained at the first node to determine whether either the first or the second error count was incremented during the data transfer, wherein the first error count represents a count of transmitting errors at the first node and the second error count represents a count of receiving errors at the second node;

program code for communicating the values of the first and second error counts, as they were prior to the data transfer, from the first node to the second node;

program code for examining, by the second node, first and second error counts of the set of error counts maintained at the second node which represent, respectively, a count of transmitting errors at the first node and a count of receiving errors at the second node, and comparing them with the values of the first and second error counts received from the first node, to determine whether there is a difference in the values of the first and second error counts detected received from the first node and the first and second error counts of the set of error counts maintained at the second node;

program code for initiating an error recovery procedure by the first node if either the first error count or the second count of the set of error counts maintained at the first node was incremented during the data transfer, the error recovery procedure resulting in the retransmission of any data lost during communication between the first node and the second node; and program code for initiating an error recovery procedure by the second node if there is a difference in the values of the first and second error counts received from the first node and the first and second error counts of the set of error counts maintained at the second node.

* * * * *

UNITED STATES PATENT AND TRADEMARK OFFICE
CERTIFICATE OF CORRECTION

PATENT NO. : 6,098,179
DATED : August 1, 2000
INVENTOR(S) : Paul Karl Harter, Jr.

It is certified that error appears in the above-indentified patent and that said Letters Patent is hereby corrected as shown below:

In claim 27, line 4, change "note" to --node--.

Signed and Sealed this

Twenty-second Day of May, 2001

*Attest:*

NICHOLAS P. GODICI

*Attesting Officer*    *Acting Director of the United States Patent and Trademark Office*